Oct. 13, 1931.  M. E. FIENE  1,827,571
INSULATION OF ELECTRICAL APPARATUS
Filed Oct. 8, 1930
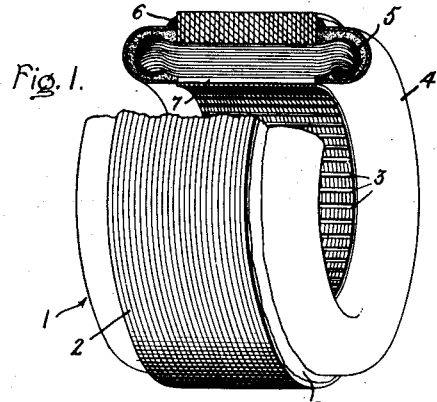
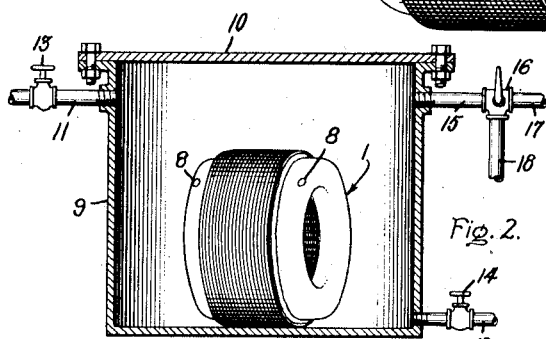
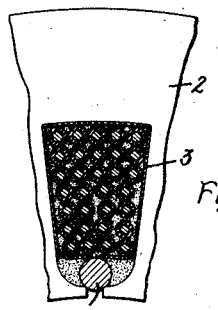
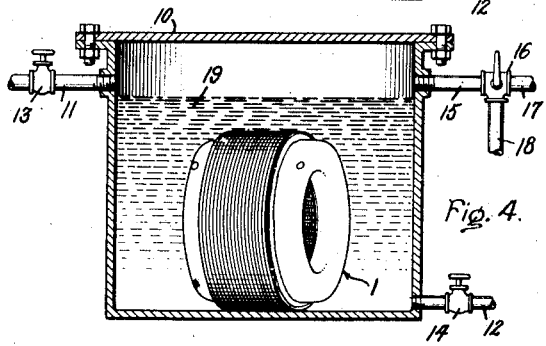
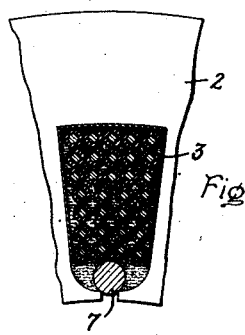
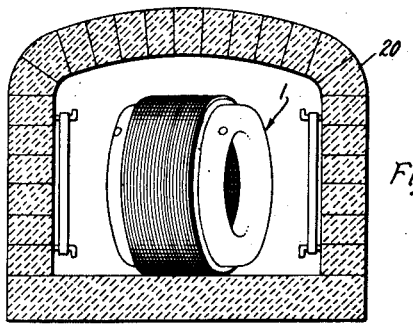
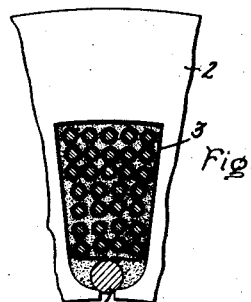
Inventor:
Marcus E. Fiene,
by Charles E. Mullen
His Attorney.

Patented Oct. 13, 1931

1,827,571

UNITED STATES PATENT OFFICE

MARCUS E. FIENE, OF BALLSTON LAKE, NEW YORK, ASSIGNOR TO GENERAL ELECTRIC COMPANY, A CORPORATION OF NEW YORK

INSULATION OF ELECTRICAL APPARATUS

Application filed October 8, 1930. Serial No. 487,304.

The present invention relates to electrical apparatus and is, more specifically, concerned with a process for insulating coils for electrical purposes and the product produced by such process.

A principal object of this invention is the provision of a coil which will have highly refractory insulation, be unaffected by lubricating oils and certain gases, particularly those suitable as refrigerants, such as sulphur dioxide, methyl formate, methyl chloride and the like, and one in which the turns are rigidly united and adequately insulated from each other so that the whole is a compact, solid, well insulated unit.

My invention will be more fully set forth in the following description, reference being had to the accompanying drawings, and its scope will be pointed out in the claims annexed to and forming part of this specification.

In the drawings, Fig. 1 is a perspective view, partially broken for the sake of clearness, of a stator of a dynamo electric machine the windings thereof being insulated in accordance with my invention; Fig. 2 is a diagrammatic sectional view of an apparatus which may be employed in carrying out the process of my invention and showing a stator therein and illustrating the first steps in the process; Fig. 3 is an enlarged fragmentary cross section of a portion of the stator illustrating diagrammatically the condition of the windings at the stage in the process corresponding to Fig. 2; Fig. 4 is a view similar to Fig. 2 but illustrating later steps in the process; Fig. 5 is a view similar to Fig. 3 but showing the windings at the stage of the treatment corresponding to Fig. 4; Fig. 6 is a view similar to Fig. 2 but illustrating the baking operation; and Fig. 7 is a view similar to Fig. 3 but showing the windings as they appear completely insulated by means of the process of the present invention.

Referring to Fig. 1 of the drawings, there is shown and generally indicated by the numeral 1 a stator of a dynamo electric machine as representative of an electrical apparatus having a coil or winding which is insulated and which may be treated in accordance with my invention. The stator comprises a magnetic body comprising laminations 2 provided with openings or slots 3 therein. Shields 4 composed preferably of non-magnetic metal, such as brass, are provided in order to protect the insulation, designated generally at 5, surrounding the end turns of the winding. These shields are secured to the stator by any suitable means, for example by soldering thereto as shown at 6. Non-magnetic metallic wedges 7 are provided in the slots 3 as shown more clearly in Figs. 3, 5 and 7.

In carrying out the process of my invention the stator is first wound in the usual manner. I employ fibrous covered conductors, the conductors being preferably copper and the covering thereon a cellulosic material, such as paper, cotton or other fibrous material or such a cellulosic material admixed with a substance, such as asbestos fibres. The slot insulation may be of the same material as the covering of the conductors but is not necessarily restricted to such material but may include such materials as mica, lacquers and the like.

The stator having been wound and the end shields fastened thereto I then introduce therein an inert inorganic filling material, such as silica, preferably of 20—30 mesh. This may be conveniently done through openings 8 in the shields. Instead of employing silica I may use any other inert filling material, which should not be too fine, as for example alumina, boron nitride, thoria, and the like. After this inert material has been introduced the holes or openings 8 are closed in any suitable way, as for example by soldering. The stator is now ready for the impregnation steps.

The stator is placed in a suitable receptacle 9 provided with a removable cover 10, and inlet and outlet pipes, 11 and 12, respectively, for the admission and withdrawal of the impregnating medium or agent, the pipes 11 and 12 having suitable controlling valves 13 and 14, respectively. The receptacle 9 is also provided with a pipe 15 leading to a valve mechanism 16 which is operatively connected to and controls suction and pressure lines 17 and 18 respectively. The stator having been placed in the receptacle the latter is closed and the valve 16 manipulated to connect the receptacle with the source of suction. After the receptacle is evacuated the valve 13 is opened to admit the impregnating agent 19 which is introduced until the stator is completely submerged therein (see Fig. 4). The suction supply is now cut off. As the impregnating agent I employ a material, such as sodium silicate, potassium silicate, and the like. I prefer to employ sodium silicate because of its general availability and comparative cheapness. It acts as an excellent coating material and sets to a rigid bond. I have found that a sodium silicate solution made from sodium silicate known to the trade as "N" brand and having a ratio of $Na_2O$ to $SiO_2$ of 1:3.25 the solution being of specific gravity of approximately 1.37 gives excellent results, but it is of course understood that my invention is not restricted to the use of this material nor to this particular specific gravity.

The valve mechanism 16 is now manipulated so that pressure is supplied through the line 18. While the pressure may vary I have found that the application of about 100 pounds pressure for about one hour is satisfactory. If higher pressures are employed the time is decreased. The impregnating agent enters the stator through the slots 3 and impregnates the covered conductors and the inert filling material. Fig. 3 illustrates on an enlarged scale and somewhat diagrammatically the condition of the coil or windings after the inert filling material has been supplied, while Fig. 5 shows similarly the condition of the windings while the stator is being treated as shown in Fig. 4.

After impregnation the stator is removed and placed in a suitable baking oven, such as the electrically heated oven 20 shown in Fig. 6. The oven is arranged so that the stator is heat-treated in an inert environment, that is, the stator receives the heat treatment in an inert gaseous medium or in a vacuum. The importance of this will be pointed out more fully hereafter. The temperature at which the stator is baked is such that the cellulosic material is decomposed and the impregnating agent is caused to firmly set and bind the individual conductors in place and also to bind the inert filling medium. I have found that a baking temperature of about 400° C. is satisfactory, although this temperature is not fixed and may be varied.

During the heat treatment in the inert atmosphere the cellulosic material surrounding the conductors of the coil decomposes to a stable compound of indeterminate composition but which is an excellent insulator. At the same time that this decomposition takes place the inert filling material is firmly bonded together by the impregnating agent, which also bonds the insulation covering firmly on the conductors. It is important that the heat treatment be carried out in the absence of air else the cellulosic material surrounding the conductors will not decompose to the stable product obtained by the process of my invention but will oxidize and in most cases completely "burn out." In Fig. 7 I have indicated on an enlarged scale and somewhat diagrammatically the coil or windings insulated after the heat treatment.

The stator is again impregnated and baked as above. The second impregnation improves the mechanical strength of the decomposed cellulosic material surrounding and insulating the individual conductors, the impregnating agent acting also as a binder. This decomposed cellulosic material also acts as an absorbent for the impregnating agent and prevents intumescence. Further impregnations and baking operations may be carried out as it is not my intention to restrict the number of impregnations and baking operations to two, although two such operations will ordinarily be found sufficient.

In some cases, after the final baking operation has been carried out it may be desirable, though not necessary, to impregnate the coil or winding with a molten inorganic insulating material of fairly high melting point i. e. over about 100° C. but below about 600° C., and which is insoluble or but slightly soluble in water, such as lead borate, lead chloride, sulphur and the like, in order to completely seal any minute pores which may be present. This is carried out by simply impregnating with the material which is allowed to solidify in air. Such a treatment will further improve the moisture resistance and mechanical qualities of the unit.

A coil formed and insulated in accordance with my invention is highly refractory in nature, and unaffected by lubricating oils. Such a coil is furthermore resistant to and unaffected by certain refrigerants, for example, sulphur dioxide, methyl formate, methyl chloride and the like, so that the coil is particularly suited for use in any electrical apparatus enclosed in a refrigerating system.

What I claim as new and desire to secure by Letters Patent of the United States, is:

1. The process of making and insulating a coil for electrical purposes, said coil consisting of fibrous covered conductors, which includes the steps of filling the spaces between the turns of the conductors with an inert filling material, impregnating with an agent adapted to coat the conductors and bind the filling material, and heating said coil so treated, in an inert environment, to cause the impregnating agent to bond the filling material and conductors in place and to decompose said fibrous covering to a stable insulating product.

2. The process of making and insulating a coil for electrical purposes, said coil consisting of fibrous covered conductors, which includes the steps of filling the spaces between the turns of the conductors with an inert inorganic filling material, impregnating with a silicious body adapted to coat the conductors and bind the filling material, and heating the coil in an inert environment at about 400° C.

3. The process of making coils for electrical purposes which includes the steps of filling the spaces between the turns of fibrous covered conductors with silica, impregnating with sodium silicate, heating in an inert atmosphere at about 400° C., and repeating said impregnation and baking operations.

4. The process of making electrical apparatus having a core structure and an insulated winding which includes the steps of filling the spaces between the windings and the core structure with silica, submerging said structure in a bath of sodium silicate and impregnating the conductors and silica therewith, heating said structure in an inert atmosphere at about 400° C., and again impregnating and heating as set forth.

5. The process of making and insulating a coil for electrical purposes, said coil consisting of fibrous covered conductors, which includes the steps of filling the spaces between the turns of the conductors with silica, impregnating said coil with sodium silicate, heating said coil in an inert atmosphere at about 400° C., repeating said impregnation and baking operations one or more times, and finally impregnating said coil with a high melting, substantially insoluble inorganic insulating material, and allowing said latter impregnating agent to solidify in air.

6. An electrical coil the turns of which are seperated by a stable insulating decomposition product of cellulose and an inert inorganic material.

7. An electrical coil the turns of which are seperated by a composition comprising a cellulosic material heat treated in an inert atmosphere and bonded with a silicious material.

8. An electrical coil the turns of which are separated by and insulated with a composition comprising a cellulosic material heat treated in an inert atmosphere and bonded together with sodium silicate, said turns being also separated by and bonded together with a rigid insulation comprising an inert inorganic filling material bonded with said sodium silicate.

9. An electrical coil the turns of which are separated by and insulated with a composition comprising a product produced by heat treating a cellulosic material at about 400° C. in an inert atmosphere, said product being bonded with silicate of an alkali metal.

10. An electrical apparatus having a core structure and an insulated winding, said winding being insulated with a composition comprising a product produced by heat treating a cellulosic material at about 400° C. in an inert atmosphere, said winding being also insulated by a bonding of sodium silicate.

11. An electrical coil the turns of which are separated by and insulated with a stable, insulating decomposition product of cellulosic material and bonded together with sodium silicate and further impregnated with high melting, substantially insoluble inorganic insulating material.

12. An electrical coil the turns of which are separated by insulation comprising a stable insulating decomposition product of cellulosic material, bonded together with a silicate of an alkali metal and also impregnated with inorganic insulating material.

In witness whereof, I have hereunto set my hand this 7th day of October, 1930.

MARCUS E. FIENE.